(12) United States Patent
Knox

(10) Patent No.: US 7,292,365 B2
(45) Date of Patent: Nov. 6, 2007

(54) METHODS AND SYSTEMS FOR DETERMINING DISTRIBUTION MEAN LEVEL WITHOUT HISTOGRAM MEASUREMENT

(75) Inventor: Keith T Knox, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1059 days.

(21) Appl. No.: 10/342,358

(22) Filed: Jan. 15, 2003

(65) Prior Publication Data

US 2004/0136610 A1 Jul. 15, 2004

(51) Int. Cl.
- G06F 15/00 (2006.01)
- H04N 1/38 (2006.01)
- G06K 15/00 (2006.01)

(52) U.S. Cl. .................. 358/1.16; 358/464; 702/180
(58) Field of Classification Search .............. 358/1.9, 358/1.2, 3.12, 522; 382/194, 228
See application file for complete search history.

(56) References Cited

U.S. PATENT DOCUMENTS

| | | | | |
|---|---|---|---|---|
| 5,602,891 | A * | 2/1997 | Pearlman | 378/62 |
| 6,043,900 | A | 3/2000 | Feng et al. | |
| 7,015,931 | B1 * | 3/2006 | Cieplinski | 345/619 |

\* cited by examiner

*Primary Examiner*—Douglas Q. Tran
*Assistant Examiner*—Thomas J. Lett
(74) *Attorney, Agent, or Firm*—Oliff & Berridge, PLC (57) ABSTRACT

Techniques for estimating an average background value and an average foreground value of an image data formed by a plurality of pixels by selecting a first plurality of pixels forming a first calculation window from the plurality of pixels, determining at least first, second and third statistical moments for the first plurality of pixels, and determining at least one of average background value and average foreground value using the at least first, second and third statistical moments determined for the first plurality of pixels.

16 Claims, 8 Drawing Sheets

METHODS AND SYSTEMS FOR DETERMINING DISTRIBUTION MEAN LEVEL WITHOUT HISTOGRAM MEASUREMENT

BACKGROUND OF THE INVENTION

1. Field of Invention

This invention generally relates to the field of automatically processing image data.

2. Description of Related Art

In automatically processing image data, it is often desired to determine the average background and the foreground levels that appear in the image data. These levels can be used to suppress background noise and to enhance the contrast between the foreground and background portion of the image data. One conventional method for determining the average background and foreground levels is to inspect a histogram determined from the image data. Typically, this histogram is bimodal, with a peak near the foreground image value and a peak near the background image value. The locations of the two peaks determine the background and foreground levels.

A significant drawback associated with this conventional method is that generally the histogram is costly in one or both of computation and memory resources. A second significant drawback associated with this conventional method is that a histogram over a small region of an image is too noisy to allow the locations of the peaks to be determined.

SUMMARY OF THE INVENTION

This invention provides systems and methods to calculate the mean values of background and foreground regions of an image data without measuring a histogram.

This invention provides systems and methods to calculate the gray levels of the background level and the foreground level of an image data without measuring a histogram.

This invention provides systems and methods to calculate the gray levels of the background level and the text level of one or more of a scanned text image, a scanned graphics image and the like without measuring a histogram.

In various exemplary embodiments, the systems and methods according to this invention determine image statistics data, for example at least first three central moments, from the pixels in the target region of the image data. The locations, relative magnitudes, and approximate width of the background and foreground peaks are estimated based on the determined at least first three central moments.

In various exemplary embodiments, the systems and methods according to this invention determine at least first three central moments, for example, the mean, variance, skewness, and kurtosis, from the pixels in the target region of the scanned text image or the scanned graphics image. The locations, relative magnitudes, and approximate width of the text and background peaks are estimated based on the determined at least first three central moments.

In various exemplary embodiments, in an adaptive calculation, the systems and methods according to this invention determine at least first three central moments recursively with only four image memory accesses per pixel per moment over a window or rectangular region of the target region of the image data.

The estimates of the foreground and background peak locations and magnitudes calculated by the systems and methods according to this invention are very robust to noise.

The estimates of the foreground and background peak locations and magnitudes calculated by the systems and methods according to this invention are accurate even for very small regions containing only a hundred pixels of the image data, such as, for example, the scanned text image or the scanned graphics image.

Systems and methods according to this invention provide for fast, robust, and accurate determinations of foreground and background peak locations and magnitudes of the image data, such as, for example, the scanned text and/or graphics image, while using a small portion of the buffer memory.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail below, with reference to the following figures, in which.

DETAILED DESCRIPTION OF PREFERRED EMBODIMENTS

Figure 1:
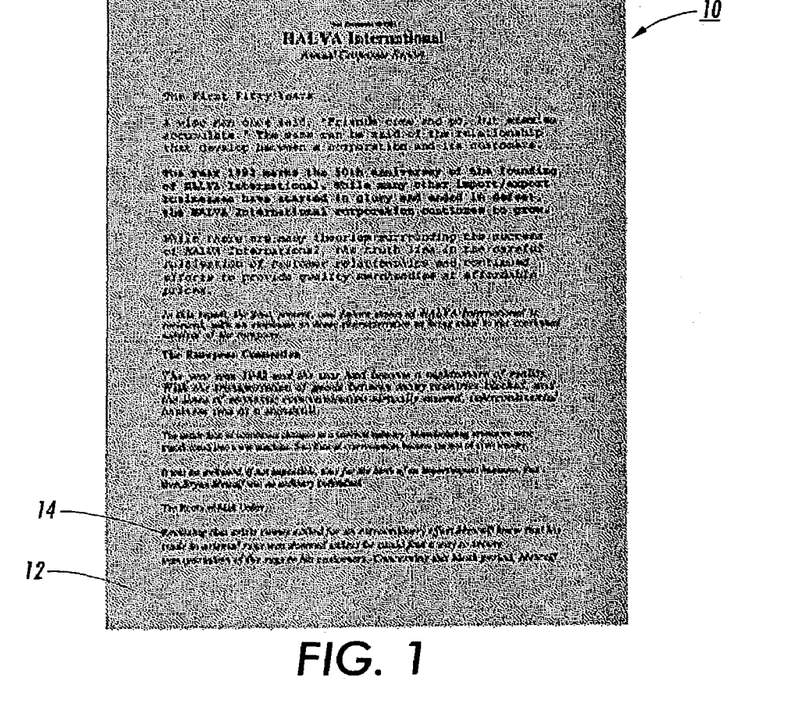
FIG. 1 shows an exemplary image data containing foreground and background data.

FIG. 1 shows an exemplary image data 10, such as, for example, a scanned image of a text document such as a text page. The image data contains background data 12, for example the background level of the blank page, and foreground data 14, such as the text on the page. For the example image data shown in FIG. 1, the image contains streaks caused by dirt on a constant velocity transport (CVT) scanner. In such a scanner, the page is moved across the platen over a stationary line scanner. Any dirt or obstruction on the platen will cause a streak in the scanned image in the direction of the motion of the paper.

Figure 2:
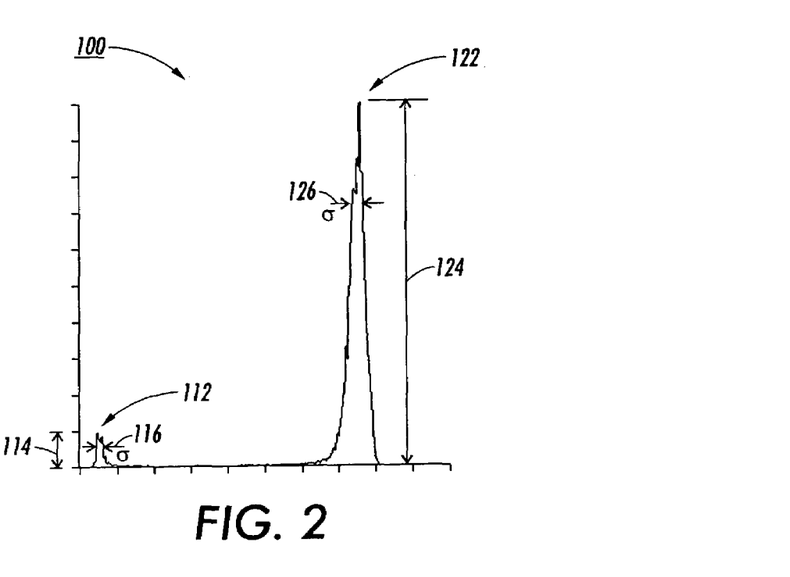
FIG. 2 shows a bimodal histogram representing the total pixel image data of 4000×5000 pixels of the image data shown in FIG. 1.

FIG. 2 shows a histogram 100 representing a histogram of the total scanned text image of 4000×5000 pixels. As shown in FIG. 2, the histogram 100 is very smooth and shows two definite peaks 112, 122. Peak 112 represents text data and peak 122 represents background data. It is a classic bimodal histogram. Existing techniques to determine the widths 116, 126 and relative magnitudes 114, 124 of the peaks 112, 122 involve methods such as smoothing and differentiation of the histogram to look for extrema. Where the derivative, or slope, of the histogram crosses zero is a location of a maximum or minimum value of the histogram. If the second derivative, or curvature, is negative, then this extreme point is a maximum value or a peak. Smoothing of the histogram is often needed prior to differentiation to prevent little bumps in the histogram from falsely registering as peaks. Other criteria, such as absolute values, may be needed to correctly identify the background and foreground peaks.

Figure 3:
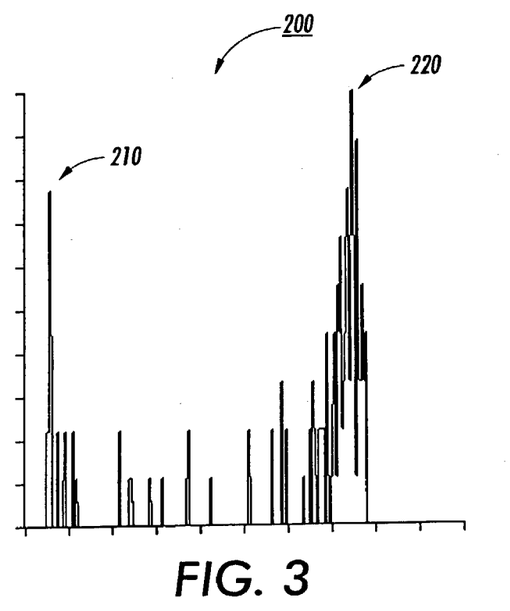
FIG. 3 shows a histogram representing a 100 pixels region of the image data shown in FIG. 1.

FIG. 3 shows a histogram 200 representing a histogram of only 100 pixels of the scanned text image. These pixels were taken from a vertical line in the third paragraph of the scanned image. Histogram 200 is much coarser than the total histogram 100 shown in FIG. 2 and has very many peaks other than the two desired peaks 210, 220. Determining the location of the two peaks 210, 220 of text and background is difficult with such a histogram when the processing is done using a computer or alike. However, the eye can easily determine the two peak locations.

This problem of very coarse histograms arises in the case of a spatially-adaptive enhancement or correction process. As one moves over the scanned image, a spatially-adaptive process would investigate the region around an individual pixel and perform different processing depending on the context of the region. For the text document data example shown in FIG. 1, as mentioned above, the image contains streaks caused by dirt on the CVT scanner. By locally detecting how the image data, for example the scanned image, differs in the directions parallel and perpendicular to the process direction of the page through the scanner, it may be possible to detect and remove the streaks. In terms of a histogram, this would require measuring local histograms over very small regions, containing very few pixels, similar to FIG. 3. A very robust method is needed to determine both background and foreground, for example text, levels of such small regions. The detection and removal of CVT dirt streaks is but one example of the need for a method of determining the background level and the foreground level, for example text level, for an image data.

In various exemplary embodiments, the method for estimating the distribution mean levels of an image data, for example an average background value and an average foreground value of an image data such as a scanned image according to this invention is used to determine the background and foreground values of an image data, such as a scanned text image, similar to what is shown in FIG. 3, but without calculating the corresponding histogram.

In various exemplary embodiments, the method for estimating the distribution mean levels of an image data, for example an average background value and an average foreground value of an image data utilizes image statistic data, for example at least the first three statistical moments determined or calculated directly from the pixel data. The method employs one or more estimation equations that are used to determine, based on the at least first three central moments determined, the locations of the two peaks corresponding to the background and the foreground of the image data, for example the scanned image. The method also employs the one or more estimation equations to determine the relative weights of the two peaks corresponding to the background and foreground of the image data. Further, the method also employs the one or more estimation equations to determine the spread of the values around the peaks.

Figure 4:
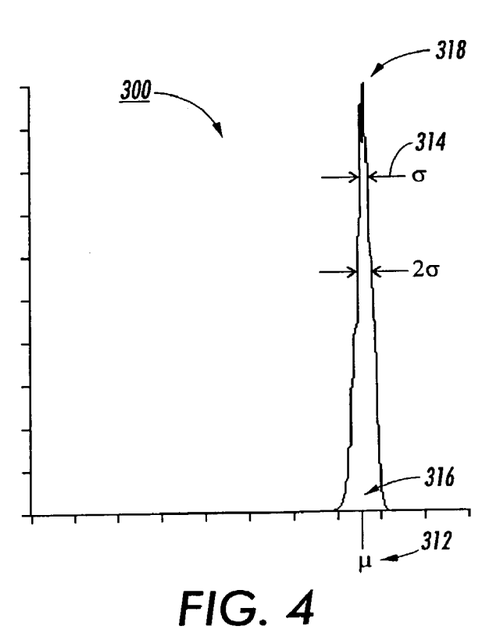
FIG. 4 shows a unimodal histogram of a 500×500 pixels region of background data, for example blank white paper, cropped from the image data of FIG. 1.

To more clearly understand the invention, it is useful to first examine a unimodal histogram, for example, a histogram that has only one peak. FIG. 4 shows such an exemplary unimodal histogram 300. Histogram 300 represents a histogram of a 500×500 pixels region of white paper, cropped from the scanned image of FIG. 1.

As shown in FIG. 4, the basic shape of unimodal histogram 300 is a gaussian peak 318 whose mean gray level 312 is $\mu$, and whose width 314 is given by the standard deviation, $\sigma$. The location 316 of the peak 318 of the histogram 300 corresponds to the average background level of the image data region. Given a symmetric gaussian distribution, it may not be necessary to actually calculate the histogram to determine the peak location 316. The peak location 316 may be determined directly from the first moment of the pixel data. Averaging all of the pixels together provides the mean 312 or average value, which for a gaussian distribution, is the location of the peak 316. The width 314 of the gaussian is given by the second moment, or the standard deviation.

Figure 5:
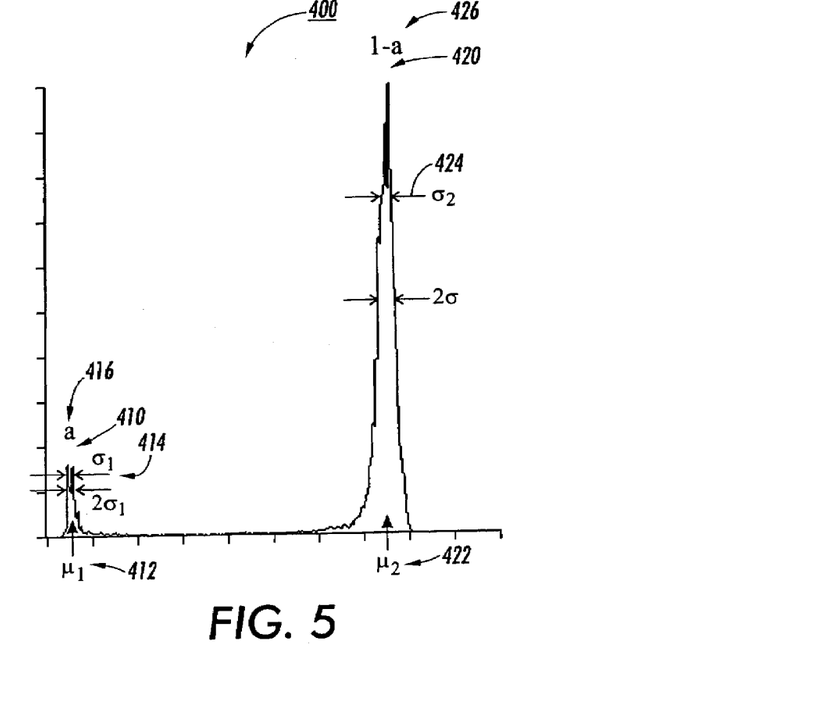
FIG. 5 shows a bimodal histogram of a 500×500 pixels region that contains foreground data, for example text data, and background data, from the image data of FIG. 1.

The technique described above does not apply well in cases where the image data are represented by a bimodal histogram, as shown by the histogram 400 in FIG. 5. Histogram 400 represents a bimodal histogram of a 500×500 pixels region that contains foreground data, for example text pixels, and background data/pixels.

As shown in FIG. 5, the bimodal histogram 400 has two peaks 410 and 420. Each peak has its own width, height and location. The location of the upper peak, peak 420, is the average value of the background pixel data, while the location of the lower peak, peak 410, is the average foreground pixel value, for example, text pixel value. The first moment, or average of the pixel data, for the bimodal histogram shown in FIG. 5 will be a mixture of the two peaks locations and relative strengths.

In various exemplary embodiments, the methods and systems according to this invention utilize the image statistic data, such as, for example, at least the first three statistical moments, or central moments, of the pixel data to determine the locations of the two peaks in the bimodal histogram. It will be appreciated by those skilled in the art that by using the methods and systems according to this invention, it is not necessary to calculate and analyze the histogram. In various exemplary embodiments, the methods and systems according to this invention employ two formulae as described in detail below.

Prior to discussing the two formulae, a discussion of a model of a bimodal histogram is provided with reference to the bimodal histogram 400 shown in FIG. 5. In various exemplary embodiments, the bimodal histogram 400 is modeled as a sum of two gaussian distributions 410 and 420. It will be appreciated by those skilled in the art that while the description contained herein discusses peaks represented as gaussian distributions, the methods and systems of the invention are not limited to only such peak distributions. Other peak distributions, such as, for example double-sided exponential distributions, are within the scope of the invention.

The first gaussian distribution 410 is located at a location 412 defined as $\mu_1$, has a width 414 defined as $\sigma_1$, and has a relative weight 416 of "a." Gaussian distribution 420 is located at a location 422 defined as $\mu_2$, has a width 424 defined as $\sigma_2$, and has a relative weight 426 of "1−a." Since the histogram 400 is a graph of the frequency of occurrence of the gray levels of that region of the image data, when its area is normalized, it is a measure of the probability density function of the pixel values.

For a gaussian distribution, the probability density function is given by:

$$p(x) = \frac{1}{\sqrt{2\pi}\,\sigma} e^{-\frac{(x-\mu)^2}{2\sigma^2}} \tag{1}$$

The $n^{th}$ moment of x is given by:

$$\langle x^n \rangle = \int x^n p(x) dx \tag{2}$$

The first five moments, in terms of the mean and standard deviation, should be equal to:

$$\langle x \rangle = \mu \tag{3}$$

$$\langle x^2 \rangle = \sigma^2 + \mu^2 \tag{4}$$

$$\langle x^3 \rangle = 3\sigma^2\mu + \mu^3 \tag{5}$$

$$\langle x^4 \rangle = 3\sigma^4 + 6\sigma^2\mu^2 + \mu^4 \tag{6}$$

$$\langle x^5 \rangle = 15\sigma^4\mu + 10\sigma^2\mu^3 + \mu^5 \tag{7}$$

The bimodal histogram is modeled as the sum of two gaussian distributions. The relative strength of the two gaussians, "a", is chosen so that the total integral of this new probability distribution is unity.

$$p(x) = \frac{a}{\sqrt{2\pi}\sigma_1} e^{-\frac{(x-\mu_1)^2}{2\sigma_1^2}} + \frac{(1-a)}{\sqrt{2\pi}\sigma_2} e^{-\frac{(x-\mu_2)^2}{2\sigma_2^2}} \tag{8}$$

Since there are five unknowns, $\mu_1$, $\sigma_1$, $\mu_2$, $\sigma_2$ and a, five equations are needed to solve for them. The first five moments of the combined gaussians are given by:

$$\langle x \rangle = a\mu_1 + (1-a)\mu_2 \tag{9}$$

$$\langle x^2 \rangle = a\sigma_1^2 + a\mu_1^2 + (1-a)\mu_2^2 \tag{10}$$

$$\langle x^3 \rangle = 3a\sigma_1^2\mu_1 + a\mu_1^3 + 3(1-a)\sigma_2^2\mu_2 + (1-a)\mu_2^3 \tag{11}$$

$$\langle x^4 \rangle = 3a\sigma_1^4 + 6a\sigma_1^2\mu_1^2 + a\mu_1^4 + 3(1-a)\sigma_2^4 + 6(1-a)\sigma_2^2\mu_2^2 + (1-a)\mu_2^4 \tag{12}$$

$$\langle x^5 \rangle = 15a\sigma_1^4\mu_1 + 10a\sigma_1^2\mu_1^3 + a\mu_1^5 + 15(1-a)\sigma_2^4\mu_2 + 10(1-a)\sigma_2^2\mu_2^3 + (1-a)\mu_2^5 \tag{13}$$

It is easier to work with the moments centered around the mean. The $n^{th}$ central moment is defined as:

$$M_n = \langle (x - \langle x \rangle)^n \rangle \tag{14}$$

After much, straightforward algebraic manipulation, the five central moments can be shown to be:

$$M_1 = a\mu_1 + (1-a)\mu_2 \tag{15}$$

$$M_2 = a\sigma_1^2 + (1-a)\sigma_2^2 + a(1-a)(\mu_1-\mu_2)^2 \tag{16}$$

$$M_3 = 3a(1-a)(\sigma_1^2 - \sigma_2^2)(\mu_1-\mu_2) + a(1-a)(1-2a)(\mu_1-\mu_2)^3 \tag{17}$$

$$M_4 = 3(a\sigma_1^4 + (1-a)\sigma_2^4) + 6a(1-a)((1-a)\sigma_1^2 + a\sigma_2^2)(\mu_1-\mu_2)^2 + a(1-a)(1-3a+3a^2)(\mu_1-\mu_2)^4 \tag{18}$$

$$M_5 = 15a(1-a)(\sigma_1^4 - \sigma_2^4)(\mu_1-\mu_2) + 10a(1-a)((1-a)^2\sigma_1^2 - a^2\sigma_2^2)(\mu_1-\mu_2)^3 + a(1-a)(1-2a)(1-2a+2a^2)(\mu_1-\mu_2)^5 \tag{19}$$

The estimates of the moments, $M_n$, on the left sides of the equations, are calculated from the pixel data by averaging the gray values raised to the corresponding power. The $n^{th}$ moment of x is calculated by:

$$\langle x^n \rangle = \frac{1}{N} \sum x^n \tag{20}$$

where N is the total number of pixels in the average. The parameters of the distribution can then be determined, in terms of the measured moments, $M_n$, by solving the above five equations, (15)-(19), for $\mu_1$, $\sigma_1$, $\mu_2$, $\sigma_2$, and a.

Solving the above presented equations (15)-(19) is difficult to perform, therefore various approximation techniques were determined. The approximation techniques were made based on observing the relative magnitudes of the different terms in the five equations (15)-(19).

In various exemplary embodiments, the methods and systems according to this invention provide for a first approximation technique that uses the first three statistical moments of the pixel data. The first approximation technique is generally simple to compute and it was found by the inventor to provide reasonably accurate results.

In various alternative embodiments, the methods and systems according to this invention provide for a second approximation technique that uses the first four statistical moments of the pixel data. The second approximation technique is more complicated to compute, but yields more accurate answers.

In various exemplary embodiments, the first approximation technique was developed based of the observation that the terms containing $\sigma_1$ and $\sigma_2$ were orders of magnitude smaller than the other terms. This is true when two very distinguishable peaks are well separated, then the $(\mu_1-\mu_2)^n$ terms dominate the equations. If the standard deviations are assumed to be zero, then there are only three variables and three equations. That is, only the first three moments are needed. The equations to be solved are:

$$M_1 = a\mu_1 + (1-a)\mu_2 \tag{21}$$

$$M_2 = a(1-a)(\mu_1-\mu_2)^2 \tag{22}$$

$$M_3 = a(1-a)(1-2a)(\mu_1-\mu_2)^3 \tag{23}$$

Simple algebraic manipulation yields the following solutions:

$$a = \frac{1}{2} + \frac{M_3}{2\sqrt{M_3^2 + 4M_2^3}} \quad (24)$$

$$\mu_1 = M_1 + \frac{M_3}{2M_2} - \frac{\sqrt{M_3^2 + 4M_2^3}}{2M_2} \quad (25)$$

$$\mu_2 = M_1 + \frac{M_3}{2M_2} + \frac{\sqrt{M_3^2 + 4M_2^3}}{2M_2} \quad (26)$$

The estimates of these three parameters, a, $\mu_1$ and $\mu_2$, solved using Eqs. 24-26, are very good. Histograms 500 and 600, shown in FIGS. 6 and 7, respectively, provide exemplary estimates of these three parameters as determined using Eqs. 24-26 above.

Figure 6:
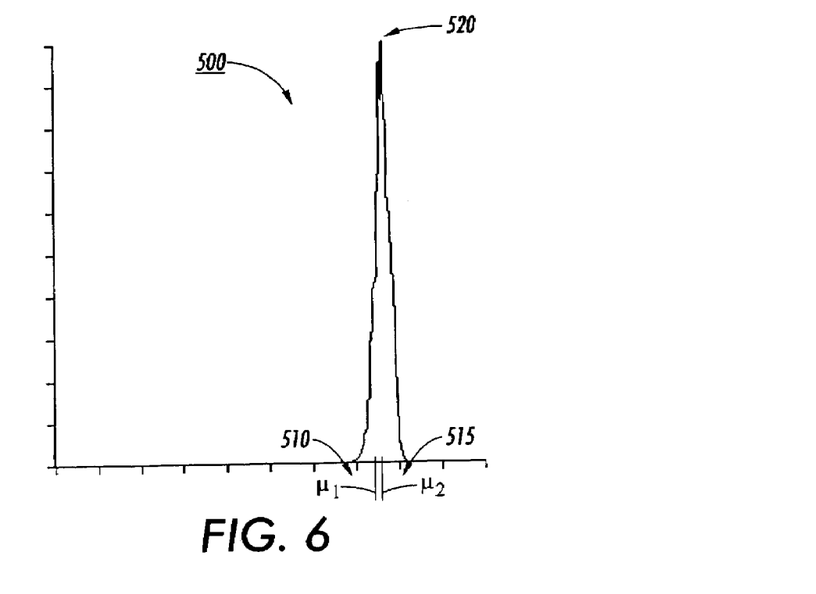
FIG. 6 shows an exemplary unimodal histogram with background and foreground levels estimated using the first approximation technique employed by the methods and systems according of this invention.

The only difficulty arises when there is only one peak in the histogram, as shown in the histogram 500 of FIG. 6. For this case, the mean values of $\mu_1$ and $\mu_2$ are very close to each other. Therefore, it is very difficult to know if the two means, $\mu_1$, $\mu_2$, are within the same peak 520. This is not a problem if only the background value is desired.

In various exemplary embodiments, the methods and systems according to this invention provide for a second approximation technique. The second approximation technique is based on the assumption that the widths of the two gaussians are equal, that is $\sigma_1 = \sigma_2 = \sigma$. This assumption enables the problem to be reduced to four equations, for four moments, $M_1$-$M_4$, and four unknowns. The addition of the $\sigma$ parameter allows the ambiguity of very close estimates of the two means to be resolved. The four equations that need to be solved are:

$$M_1 = a\mu_1 + (1-a)\mu_2 \quad (27)$$

$$M_2 = \sigma^2 + a(1-a)(\mu_1 - \mu_2)^2 \quad (28)$$

$$M_3 = a(1-a)(1-2a)(\mu_1 - \mu_2)^3 \quad (29)$$

$$M_4 = 3\sigma^4 + 6a(1-a)\sigma^2(\mu_1-\mu_2)^2 + a(1-a)(1-3a+3a^2)(\mu_1-\mu_2)^4 \quad (30)$$

The solution to these equations is complicated and involves solving a third-order polynomial. If we define three new variables, p, q and z:

$$z = \left(\frac{M_3}{2}\right)^4 + \left(\frac{M_4 - 3M_2^2}{6}\right)^3 \quad (31)$$

When z is positive, then $$p = \sqrt[3]{-\left(\frac{M_3}{2}\right)^2 + \sqrt{\left(\frac{M_3}{2}\right)^4 + \left(\frac{M_4 - 3M_2^2}{6}\right)^3}} + \sqrt[3]{-\left(\frac{M_3}{2}\right)^2 - \sqrt{\left(\frac{M_3}{2}\right)^4 + \left(\frac{M_4 - 3M_2^2}{6}\right)^3}} \quad (32)$$

Otherwise, if z is negative, then $$p = 2\sqrt{-\frac{M_3}{3}} \cos\left(\frac{\phi}{3} + \frac{2\pi}{3}\right) \quad (33)$$

where $$\phi = \cos^{-1}\left(\frac{(M_4 - 3M_2^2)/2}{M_3^3/27}\right) \quad (34)$$

Independent of the sign of z, the value of q is given by:

$$q = \frac{M_3}{p} \quad (35)$$

In terms of p and q, the four parameters of the solution are given by:

$$a = \frac{1}{2} - \frac{q/2}{\sqrt{q^2 - 4p}} \quad (36)$$

$$\mu_1 = M_1 - \frac{q}{2} - \frac{\sqrt{q^2 - 4p}}{2} \quad (37)$$

$$\mu_2 = M_1 - \frac{q}{2} + \frac{\sqrt{q^2 - 4p}}{2} \quad (38)$$

$$\sigma^2 = M_2 + p \quad (39)$$

Figure 7:
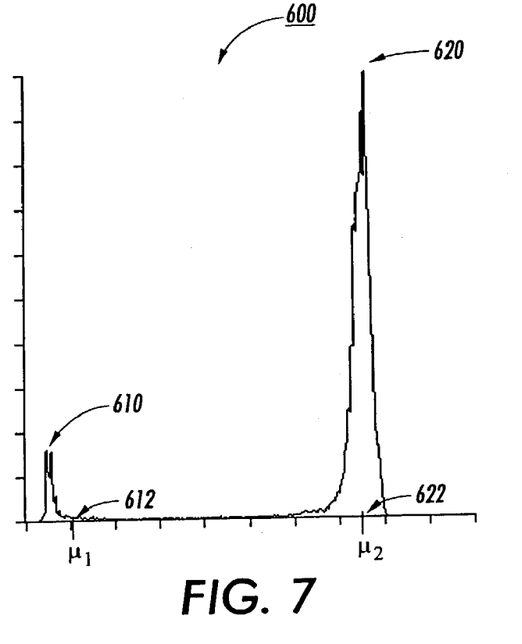
FIG. 7 shows an exemplary bimodal histogram with background and foreground levels estimated using the first approximation technique employed by the methods and systems according of this invention.
Figure 8:
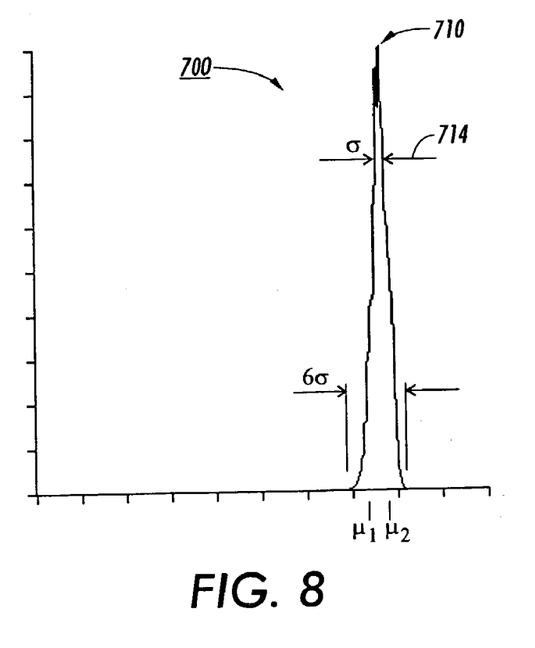
FIG. 8 shows the exemplary unimodal histogram of FIG. 6 with background and foreground levels and peak widths estimated using the second approximation technique employed by the methods and systems according of this invention.
Figure 9:
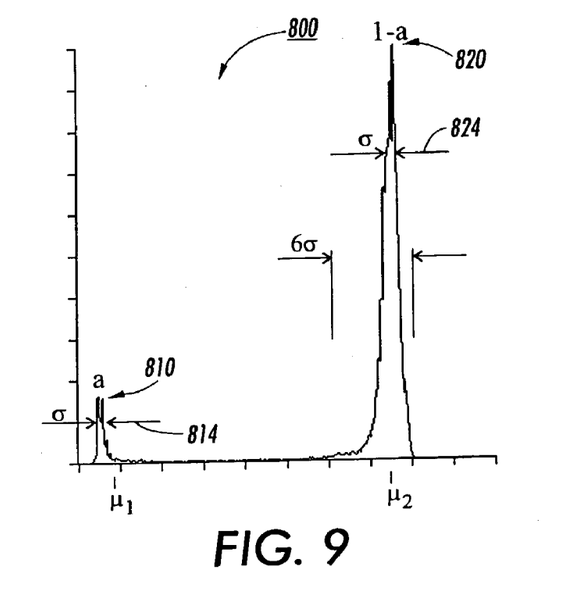
FIG. 9 shows the exemplary bimodal histogram of FIG. 7 with background and foreground levels and peak widths estimated using the second approximation technique employed by the methods and systems according of this invention.

This second approximation technique solution presented in Equations 36-39 gives very similar answers to the first approximation technique shown in Equations 24-26 above. The results of the second approximation technique solution equations, Eqs. 36-39, applied to the same unimodal and bimodal histograms shown in FIGS. 6 and 7, are shown in FIGS. 8 and 9. FIG. 8 illustrates a unimodal histogram 700 having a single peak 710. FIG. 9 illustrates a bimodal histogram 800 having a peak 810 representing foreground, for example text data, and a peak 820 representing background data.

The second approximation technique solution has two advantages over the simpler first approximation technique solution or calculation. The first advantage is that an estimate of the width, 714, 814, 824 of the peaks 710, 810, 820 is given. This allows the unimodal case to be distinguished from the bimodal case. If the two means, $\mu_1$, $\mu_2$, are within 6$\sigma$ of each other, then it is reasonable to assume that there is only one peak. The second advantage is that the second approximation technique solution tends to give more accurate estimates of the text peak, $\mu_1$, when the text peak is very weak.

Figure 10:
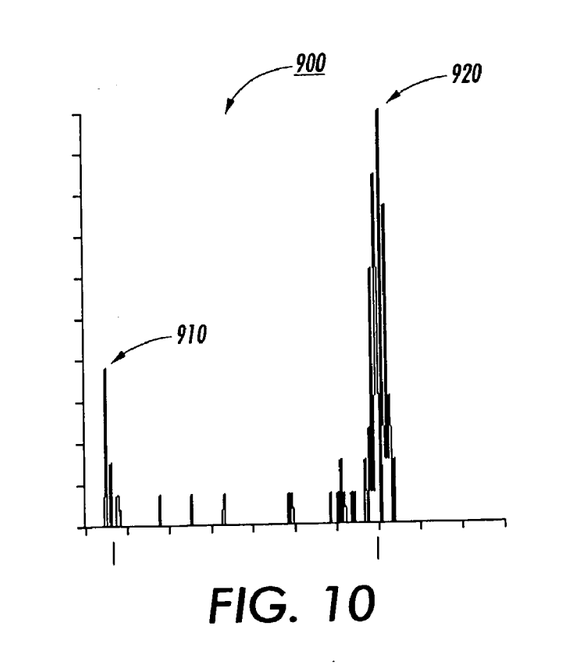
FIG. 10 shows an exemplary histogram of an image data region containing only 100 pixels with background and foreground levels estimated, as determined using the second approximation technique employed by the methods and systems according to this invention.
Figure 11:
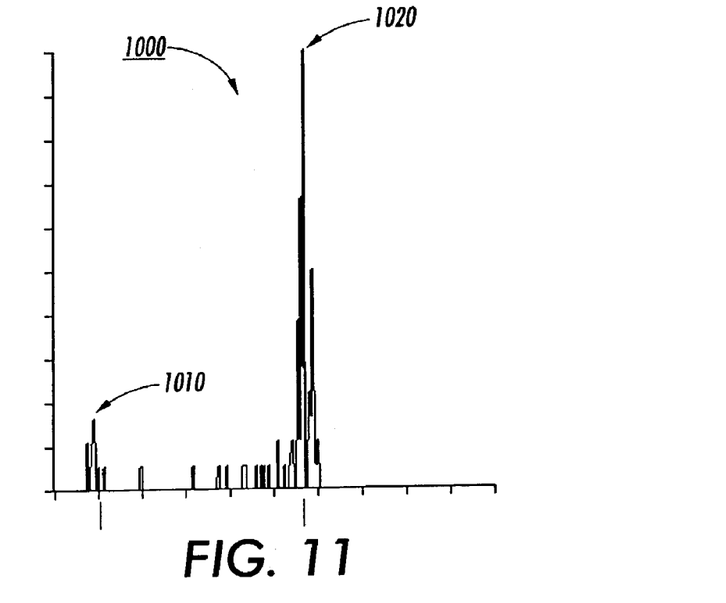
FIG. 11 shows another exemplary histogram of an image data region containing only 100 pixels with background and foreground levels estimated, as determined using the second approximation technique employed by the methods and systems according to this invention.
Figure 12:
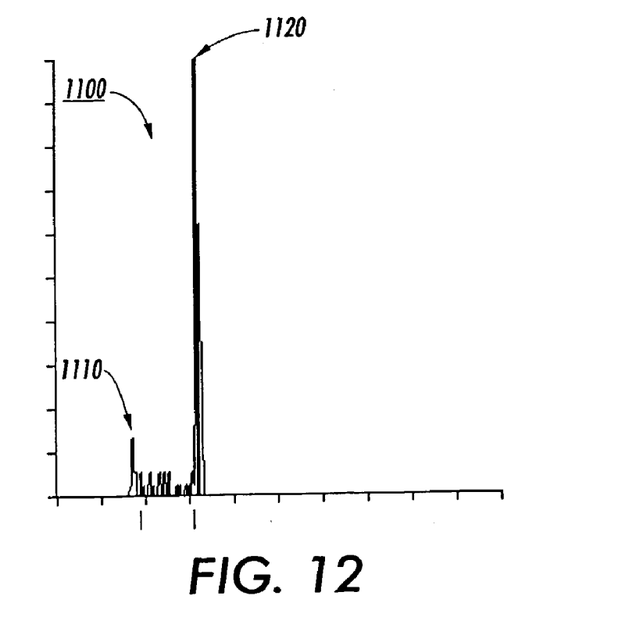
FIG. 12 shows another exemplary histogram of an image data region containing only 100 pixels with background and foreground levels estimated, as determined using the second approximation technique employed by the methods and systems according to this invention.

The first and second approximation technique solutions of this invention also work very well when there are very few pixels to be averaged. FIGS. 10, 11 and 12 illustrate several exemplary histograms 900, 1000, 1100 of regions containing only 100 pixels. As shown in FIGS. 10-12, histograms 900, 1000, 1100 are very broken up. However, by employing the second approximation technique solution of this invention, the process is still able to determine the locations of the two peaks 910, 920, 1010, 1020, 1110 and 1120.

It will be appreciated by those skilled in the art that the calculations using the first and second approximation technique solutions of this invention do not create a histogram but provide estimations from at least three measured central moments.

In various exemplary embodiments, the method using the first or second approximation technique solutions according to this invention may be computed quickly and does not require storing any histograms. This makes the method very suitable for adaptive processes that adjust the processing step based on the context of the neighboring pixels, such as changing background level or changing contrast of the foreground level, for example the text level.

Furthermore, the method using the first or second approximation technique solutions according to this invention does not require calculating a histogram at every pixel location. What is required at every pixel is that at least three spatially-varying moment averages be calculated. There is a fast method to calculate a spatially-varying average, or blur, for a rectangular sliding window. This iterative averaging method addresses only four neighbors, at any one location, and therefore is very fast. In comparison, the brute-force moving window averaging method is proportional to the number of elements in the window, which can be several orders of magnitude longer.

The calculation of the at least three moment averages is just like the linear blur window. Each moment is a simple moving-window average of the gray level of the pixel raised to a power. This latter operation can be done with a simple lookup table. A buffer is needed to store the previous scanlines that reach as far back as the height of the window. No buffer space is needed for any histograms. Since a histogram is 256 times larger than a single average value, this is a significant savings in buffer space.

Figure 13:
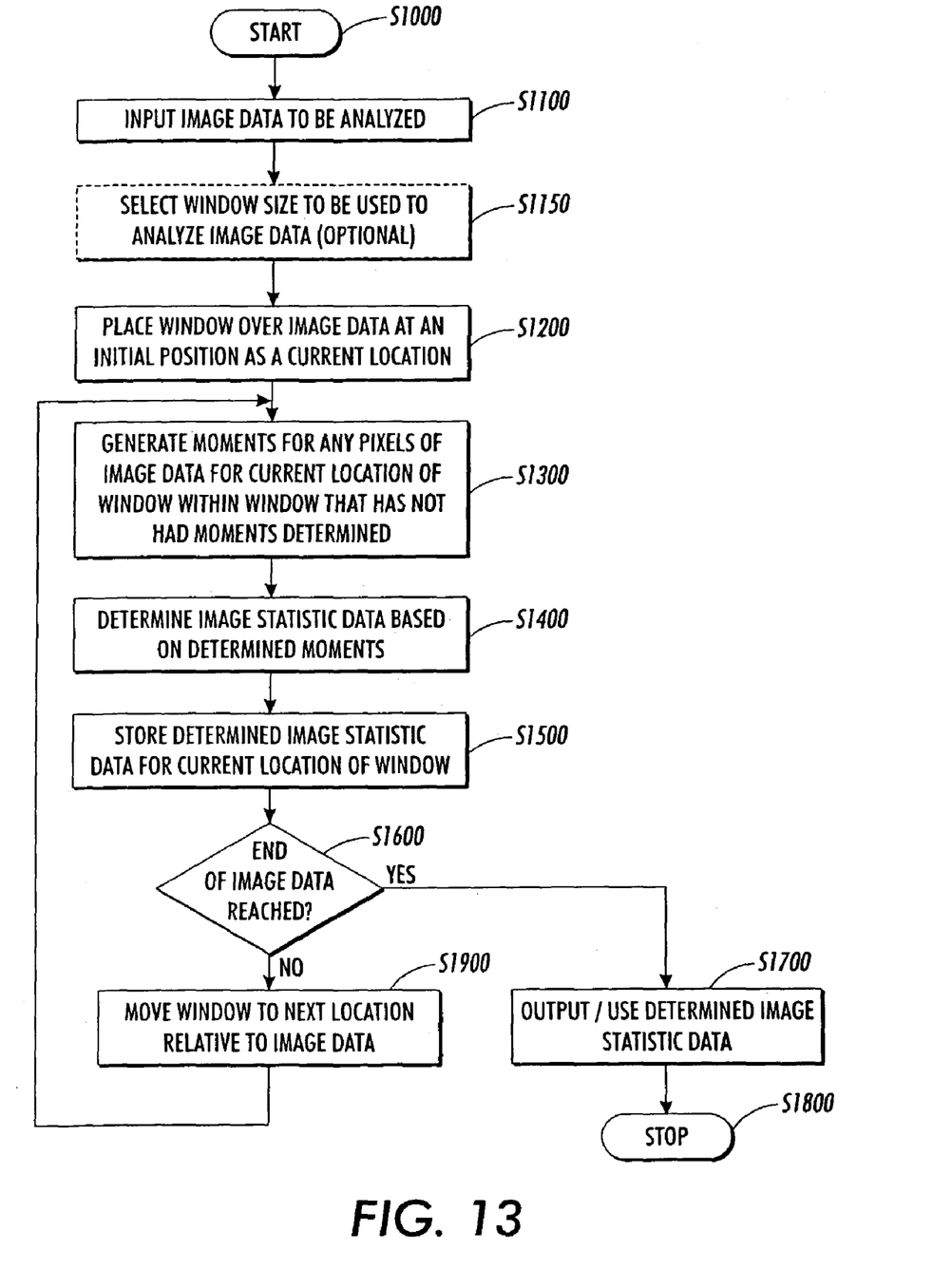
FIG. 13 is a flowchart outlining one exemplary embodiment of a method for determining distribution mean level of background and foreground data of an image data according to this invention.

FIG. 13 is a flowchart outlining one exemplary embodiment of a method for calculating the distribution mean levels of both the background level and the foreground level, such as, for example, text level, of an image data, such as for example, a scanned text image, a graphics image or alike, without measuring a histogram, according to this invention.

As shown in FIG. 13, operation begins at step S1000 and continues to step S1100, where the image data to be analyzed is provided or inputted into a memory. The image data may include one or more of a scanned image formed by a plurality of pixels, a graphics image formed by a plurality of pixels or alike. The scanned image data may include text data and/or graphics data. Operation may then continue to optional step S1150 or to step S1200.

In optional step S1150, the size of the calculation window to be used to analyze image data inputted in step S1100 may be selected. The selection of the size of the calculation window is based on the nature of the processing algorithm being implemented and the nature of the image features in the image data. For example, if the purpose of the calculation of the distribution mean levels is to detect vertical streaks in the image data, then a window size that is very narrow and very tall might be applicable. If a calculation window size selection is not desired or requested, step S1150 is bypassed, a default window size is chosen, and operation continues from step S1100 directly to step S1200.

In step S1200, the calculation window is placed over the image data at an initial position as a current location. This calculation window includes a first plurality of pixels that are selected from the plurality of pixels of the image data. The location of the initial window position will depend on the format in which the pixels are stored. Typically, the upper left corner of the image data is stored at the beginning of the image data and this would be where the window is initially placed. The shape of the window would depend on the nature of the processing that uses the statistical calculations. The easiest window shape to use is rectangular.

Next, in step S1300, at least the first, second and third statistical moments are determined for the window in its current position, by including any pixels of the first plurality of pixels of the image data for the current location of the window within the window that have not yet been included in the calculation of the at least first three moments for this window position.

Then, in step S1400, image statistic data is determined based on the at least first three moments determined in step S1300 using Equations 24-26 and 36-39 described above. In various exemplary embodiments, at least one of an average background value, an average foreground value, or alike is determined based on the determined at least first three moments. In various exemplary embodiments, the average foreground value may include one or more of an average text value, an average graphics value or a combination thereof. In one exemplary embodiment, determining the image statistics data of foreground level, background level and relative peak strength from the first, second and third statistical moments for the first plurality of pixels of the image data in the current window is performed using the first approximation technique Equations 24-26. In another exemplary embodiment, determining the image statistic data of the foreground level, background level, relative peak strength and the average peak width from the first, second, third and fourth statistical moments for the first plurality of pixels of the image data in the current window is performed using the second approximation technique Equations 36-39.

Operation then continues to step S1500, where the image statistic data determined for the current calculation window can be stored, if it is to be used at a later time. The image statistic data can also be used in step S1500, with or without storing the image statistic data, to modify a portion of the first plurality of pixels of image data within the current window. If the image is modified, then these modifications are stored separately from the image data being analyzed.

In step S1600, a determination is made whether the end of the image data has been reached. If so, the operation continues to step S1700 where an output solution is provided based on the determined image statistic data for the image data. This output could contain the image statistic data, which is stored for later use in modifying the input image data. The output could be a modified version of the input image data, where the modifications were made using the image statistic data as it was calculated. The output could also be a further refinement of the image statistic data to provide additional analysis of the input image data. Operation then continues to step S1800 where the operation of the method stops.

If a determination is made in step S1600 that the end of the image data has not been reached, the operation continues to step S1900 where the calculation window is moved to a next location relative to the image data to be analyzed. Operation then returns to step S1300 where the operation of the method is repeated.

The at least first three statistical moments are determined in step S1300. Equation 20 defines how to calculate the $n^{th}$ statistical moment. In that equation, the summation is performed over the first plurality of pixels of the image data contained within the window in its current position. Each pixel value is raised to the power of "n", summed together and the sum divided by the number of pixels within the window.

The at least first three central moments are calculated using equation 14. By expanding the parenthetic expression that is raised to the $n^{th}$ power in equation 14, the central moments can be written in terms of the at least first three statistical moments defined by equation 20. It is these at least three central moments that are used in Equations 24-26 and 36-39 to determine the image statistic data in step S1400.

In step S1300, the at least first three statistical moments are calculated using Equation 20. For each new position of the current window, the summation of the first plurality of pixels of image data can be calculated over the window directly. To those skilled in the art, a method is known to reduce calculations of repeated summations in a sliding window that moves over the image data by shifting positions one pixel location at a time. The method involves saving intermediate sums and adding and subtracting pixel values at the edges of the window. This method can be easily applied to the determination of the at least first three statistical moments in step S1300.

Figure 14:
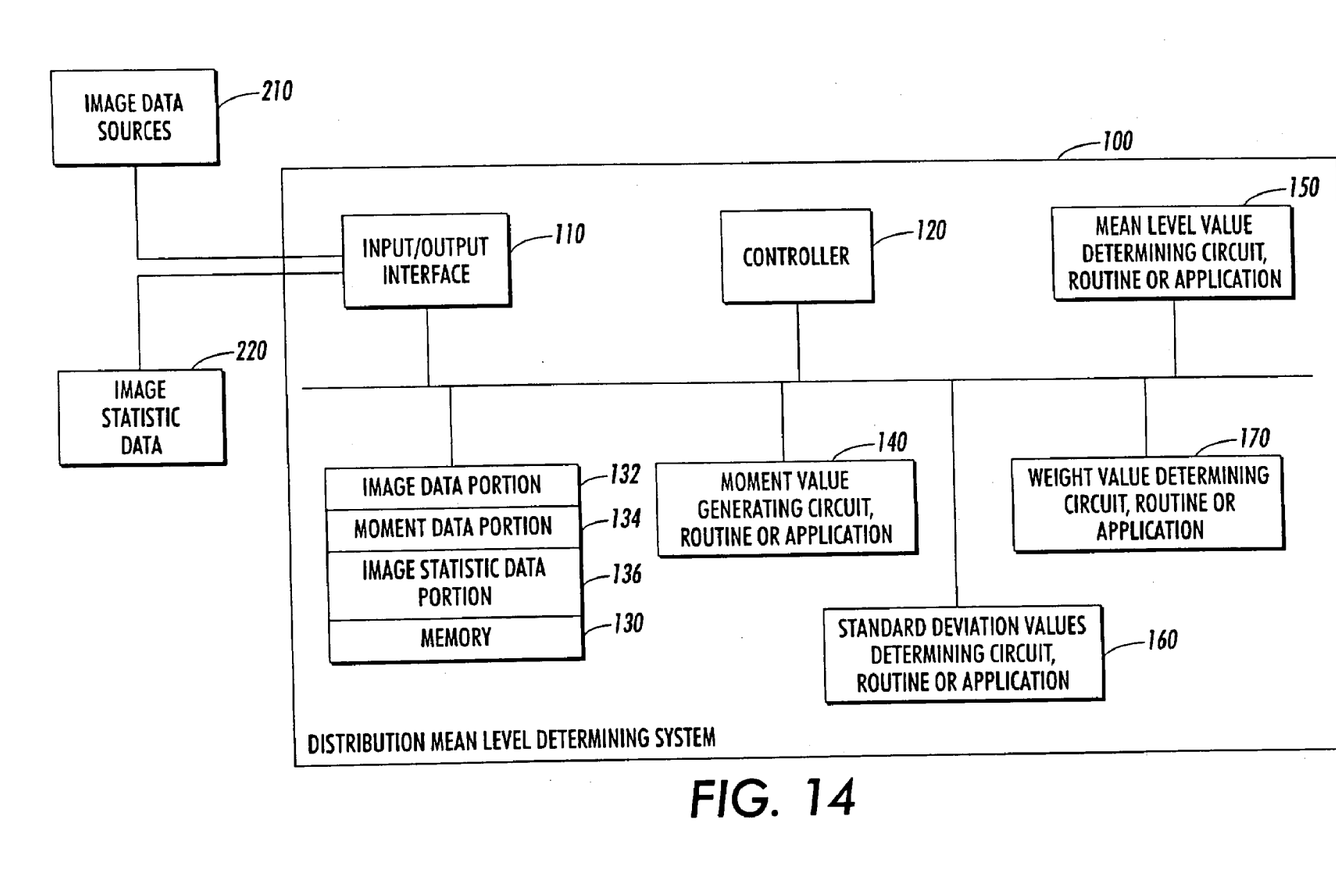
FIG. 14 is a block diagram of one exemplary embodiment of a system for determining distribution mean level of background and foreground data of an image data according to this invention.

FIG. 14 is a block diagram of an exemplary embodiment of a distribution mean level determining system 100, for example a background level adaptive calculation system 100, according to this invention. The system 100 may be used to implement, for example, the exemplary method described above and shown in FIG. 13.

As shown in FIG. 14, the exemplary distribution mean level determining system 100, for example the background level adaptive calculation system 100, comprises one or more image data sources 210 usable to process the image data to be analyzed, and one or more image statistic data storage devices 220 usable to store image statistic data processed. The one or more image data sources 210 and the one or more mage statistic data storage devices 220 are connected to the distribution mean level determining system 100 through an input/output interface 110 via one or more communication links 211 and 221, respectively.

The one or more communication links 211 and 221 can be any known or later developed device or system for connecting the image data sources 210 and the image statistic data storage devices 220 to the distribution mean level determining system 100 and/or to a network (not shown), including a connection over public switched telephone network, a direct cable connection, a connection over a wide area network, a local area network and/or a storage area network, a connection over an intranet and/or an extranet, a connection over the Internet, or a connection over any other distributed processing network or system. In general, the links 211 and 221 can be different from each other and each link 211 and 221 can be any known or later developed connection system or structure usable to connect the image data sources 210 and the image statistic data storage devices 220 to the distribution mean level determining system 100 and/or to a network.

In various exemplary embodiments, the distribution mean level determining system 100 includes one or more of a controller 120, a memory 130, a moment value generating circuit, routine or application 140, a mean level value determining circuit, routine or application 150, a standard deviation values determining circuit, routine or application 160, and a weight value determining circuit, routine or application 170, which are interconnected over one or more data and/or control buses and/or application programming interfaces 180.

In various exemplary embodiments, the memory 130 includes one or more of a image data portion model 132, a moment data portion model 134, and an image statistic data portion model 136.

The controller 120 controls the operation of the other components of the distribution mean level determining system 100. The controller 120 also controls the flow of data between components of the distribution mean level determining system 100 as needed. The memory 130 can store information coming into or going out of the distribution mean level determining system 100, may store any necessary programs and/or data implementing the functions of the distribution mean level determining system 100, and/or may store data and/or user-specific processing information at various stages of processing.

In use, an image data, such as, for example, a text image or a graphics image, formed by a plurality of pixels may be input into the distribution mean level determining system 100, for example the background level adaptive calculation system 100 via the image data sources device 210 and stored in the memory 130. Using the one or more of memory models 132, 134 and/or 136, and the moment value generating circuit, routine or applications 140, the image data, such as for example the text or graphics image data and the background data is processed to generate the at least first three moments of the processed image data.

The generated at least first three moments of the processed image data are then used by the mean level value determining circuit, routine or application 150, the standard deviation values determining circuit, routine or application 160, and the weight value determining circuit, routine or application 170, to determine mean level values, standard deviation values, and weight values, respectively, of the image data processed.

The systems and methods for determining distribution mean levels according to this invention may be implemented on a programmed general purpose computer. However, the systems and methods according to this invention can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 13 can be used to implement the systems and methods according to this invention.

The various blocks shown in FIG. 14 can be implemented as portions of a suitably programmed general-purpose computer. Alternatively, the various blocks can be implemented as physically distinct hardware circuits within an ASIC, or using a FPGA, a PDL, a PLA or a PAL, or using discrete logic elements or discrete circuit elements. The particular form each of the blocks will take is a design choice and will be obvious and predicable to those skilled in the art.

The memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Although the invention has been described in detail, it will be apparent to those skilled in the art that various modifications may be made without departing from the scope of the invention.

What is claimed is:

1. A method for estimating an average background value and an average foreground value of an image data formed by a plurality of pixels, the method comprising:
   selecting a first plurality of pixels forming a first calculation window from the plurality of pixels;
   determining at least first, second and third statistical moments for the first plurality of pixels;
   determining an average background value and an average foreground value using the at least first, second and third statistical moments determined for the first plurality of pixels; and
   outputting results based on the determined statistical moments;
   wherein determining at least one of average background value and average foreground value is based on the first, second and third statistical moments determined for the first plurality of pixels, determining at least one of average background value and average foreground value beina performed using first approximation techniciue equations $$a = \frac{1}{2} + \frac{M_3}{2\sqrt{M_3^2 + 4M_2^3}}$$

$$\mu_1 = M_1 + \frac{M_3}{2M_2} - \frac{\sqrt{M_3^2 + 4M_2^3}}{2M_2}$$

$$\mu_2 = M_1 + \frac{M_3}{2M_2} + \frac{\sqrt{M_3^2 + 4M_2^3}}{2M_2}$$

where
   $M_n$, represents the $n^{th}$ central moment,
   "a" represents the relative strength of peaks formed by background and foreground data of the image data, and
   "$\mu_1$" and "$\mu_1$" represent mean values of the peaks formed by foreground and background data of the image data.

2. The method of claim 1, wherein determining at least first, second and third statistical moments for the first plurality of pixels comprises determining at least one of statistical mean value, statistical variance value, skewness value and kurtosis value.

3. The method of claim 1 further comprising:
   selecting at least one pixel from a second plurality of pixels forming a second calculation window;
   determining at least first, second and third statistical moments for the at least one pixel in the second plurality of pixels; and
   determining the average background value and the average foreground value using the at least first, second and third statistical moments determined for the second plurality of pixels.

4. The method of claim 1, wherein determining at least one of average background value and average foreground value is based on the first, second, third and fourth statistical moments determined for the first plurality of pixels, determining at least one of average background value and average foreground value is performed using second approximation technique equations $$a = \frac{1}{2} - \frac{q/2}{\sqrt{q^2 - 4p}}$$

-continued $$\mu_1 = M_1 - \frac{q}{2} - \frac{\sqrt{q^2 - 4p}}{2}$$

$$\mu_2 = M_1 - \frac{q}{2} + \frac{\sqrt{q^2 - 4p}}{2}$$

$$\sigma^2 = M_2 + p$$

where
   $M_n$ represents the $n^{th}$ central moment,
   "a" represents the relative strength of peaks formed by background and foreground data of the image data,
   "$\mu_1$" and "$\mu_2$" represent mean values of the peaks formed by foreground and background data of the image data,
   "$\sigma^2$" represents the square of width of the peaks formed by background and foreground data of the image data, $$z = \left(\frac{M_3}{2}\right)^4 + \left(\frac{M_4 - 3M_2^2}{6}\right)^3$$

if z is positive, then $$p = \sqrt[3]{-\left(\frac{M_3}{2}\right)^2 + \sqrt{\left(\frac{M_3}{2}\right)^4 + \left(\frac{M_4 - 3M_2^2}{6}\right)^3}} +$$

$$\sqrt[3]{-\left(\frac{M_3}{2}\right)^2 - \sqrt{\left(\frac{M_3}{2}\right)^4 + \left(\frac{M_4 - 3M_2^2}{6}\right)^3}};$$

otherwise, if z is negative, then $$p = 2\sqrt{-\frac{M_3}{3}} \cos\left(\frac{\phi}{3} + \frac{2\pi}{3}\right);$$

where $\phi = \cos^{-1}\left(\frac{(M_4 - 3M_2^3)/2}{M_3^3/27}\right)$; and $$q = \frac{M_3}{p}.$$

5. The method of claim 1 further comprising determining a relative strength of the peaks formed by background and foreground data of the image data.

6. The method of claim 1 further comprising determining an average width of each peak formed by background and foreground data of the image data.

7. A method for estimating an average background value and an average text value of a scanned image having a plurality of pixels, the method comprising:
   determining at least three spatially-varying averages at every pixel; and
   wherein determining at least one of averaae background value and average text value is based on at least first, second and third statistical moments determined for the first plurality of pixels, determining at least one of average background value and average text value being performed using first approximation techniciue equations $$a = \frac{1}{2} + \frac{M_3}{2\sqrt{M_3^2 + 4M_2^3}}$$

$$\mu_1 = M_1 + \frac{M_3}{2M_2} - \frac{\sqrt{M_3^2 + 4M_2^3}}{2M_2}$$

$$\mu_2 = M_1 + \frac{M_3}{2M_2} + \frac{\sqrt{M_3^2 + 4M_2^3}}{2M_2}$$

where $M_n$ represents the $n^{th}$ central moment,

"a" represents a relative strength of peaks formed by background and text data of the image data, and "$\mu_1$" and "$\mu_2$" represent mean values of the peaks formed by text data and background of the image data.

8. The method of claim 7, wherein determining at least three spatially-varying averages at every pixel comprises determining at least one of statistical mean value, statistical variance value, skewness value and kurtosis value.

9. A computer-readable recording medium that stores a control program for providing instructions for estimating an average background value and an average foreground value of a scanned image formed by a plurality of pixels, which, when executed by a processor, cause the processor to perform operations comprising:

selecting a first plurality of pixels forming a first calculation window from the plurality of pixels; determining at least first, second and third statistical moments for the first plurality of pixels; and determining an average background value and an average foreground value using the at least first, second and third statistical moments determined for the first plurality of pixels;

wherein determining at least one of average background value and average foreground value is based on the first, second and third statistical moments determined for the first plurality of pixels, determining at least one of average background value and average foreground value being performed using first approximation technique equations $$a = \frac{1}{2} + \frac{M_3}{2\sqrt{M_3^2 + 4M_2^3}}$$

$$\mu_1 = M_1 + \frac{M_3}{2M_2} - \frac{\sqrt{M_3^2 + 4M_2^3}}{2M_2}$$

$$\mu_2 = M_1 + \frac{M_3}{2M_2} + \frac{\sqrt{M_3^2 + 4M_2^3}}{2M_2}$$

where $M_n$ represents the $n^{th}$ central moment.

"a" represents the relative strength of peaks formed by background and foreground data of the image data, and "$\mu_1$" and "$\mu_2$" represent mean values of the peaks formed by foreground and background data of the image data.

10. The machine-readable medium of claim 9, wherein determining at least first, second and third statistical moments for the first plurality of pixels comprises determining at least one of statistical mean value, statistical variance value, skewness value and kurtosis value.

11. A background level adaptive calculation system comprising:

a memory; and a background level adaptive calculation circuit, routine or application that determines an average background value and an average text value of a scanned image formed by a plurality of pixels by selecting a first plurality of pixels forming a first calculation window from the plurality of pixels, determining at least first, second and third statistical moments for the first plurality of pixels, and determining an average background value and average an text value using the at least first, second and third statistical moments determined for the first plurality of pixels, wherein determining at least one of average background value and average text value is based on the at least first, second and third statistical moments determined for the first plurality of pixels, determining at least one of average background value and average text value being performed using first approximation technique equations $$a = \frac{1}{2} + \frac{M_3}{2\sqrt{M_3^2 + 4M_2^3}}$$

$$\mu_1 = M_1 + \frac{M_3}{2M_2} - \frac{\sqrt{M_3^2 + 4M_2^3}}{2M_2}$$

$$\mu_2 = M_1 + \frac{M_3}{2M_2} + \frac{\sqrt{M_3^2 + 4M_2^3}}{2M_2}$$

where $M_n$ represents the $n^{th}$ central moment,

"a" represents the relative strength of peaks formed by background and text data of the image data, and "$\mu_1$" and "$\mu_2$" represent mean values of the peaks formed by text data and background of the image data.

12. The background level adaptive calculation system of claim 11, wherein determining at least first, second and third statistical moments for the first plurality of pixels comprises determining at least one of statistical mean value, statistical variance value, skewness value and kurtosis value.

13. The background level adaptive calculation system of claim 11, wherein the background level adaptive calculation circuit, routine or application further determines the average background value and the average text value of the scanned image formed by a second plurality of pixels by selecting at least one pixel from a second plurality of pixels forming a second calculation window, determining at least first, second and third statistical moments for the at least one pixel in the second plurality of pixels, and determining the average background value and the average text value using the at least first, second and third statistical moments determined for the second plurality of pixels.

14. The background level adaptive calculation system of claim 11, wherein determining at least one of average background value and average text value is based on the first, second, third and fourth statistical moments determined for the first plurality of pixels, determining at least one of average background value and average text value being performed using second approximation technique equations $$a = \frac{1}{2} - \frac{q/2}{\sqrt{q^2 - 4p}}$$

$$\mu_1 = M_1 - \frac{q}{2} - \frac{\sqrt{q^2 - 4p}}{2}$$

$$\mu_2 = M_1 - \frac{q}{2} + \frac{\sqrt{q^2 - 4p}}{2}$$

$$\sigma^2 = M_2 + p$$

where $M_n$ represents the $n^{th}$ central moment,

"a" represents the relative strength of peaks formed by background and text data of the image data, "$\mu_1$" and "$\mu_1$" represent mean values of the peaks formed by text data and background of the image data, "$\sigma^2$" represents the square of width of the peaks formed by background and text data of the image data, $$z = \left(\frac{M_3}{2}\right)^4 + \left(\frac{M_4 - 3M_2^2}{6}\right)^3$$

if z is positive, then $$p = \sqrt[3]{-\left(\frac{M_3}{2}\right)^2 + \sqrt{\left(\frac{M_3}{2}\right)^4 + \left(\frac{M_4 - 3M_2^2}{6}\right)^3}} +$$

$$\sqrt[3]{-\left(\frac{M_3}{2}\right)^2 - \sqrt{\left(\frac{M_3}{2}\right)^4 + \left(\frac{M_4 - 3M_2^2}{6}\right)^3}};$$

otherwise, if z is negative, then $$p = 2\sqrt{-\frac{M_3}{3}} \cos\left(\frac{\phi}{3} + \frac{2\pi}{3}\right);$$

where $\phi = \cos^{-1}\left(\frac{(M_4 - 3M_2^3)/2}{M_3^3/27}\right)$; and $$q = \frac{M_3}{p}.$$

15. The background level adaptive calculation system of claim 11, wherein the background level adaptive calculation circuit, routine or application further determines a relative strength of the peaks formed by background and text data of the image data.

16. The background level adaptive calculation system of claim 11, wherein the background level adaptive calculation circuit, routine or application further determines an average width of each peak formed by background and text data of the image data.

* * * * *